United States Patent
Lee et al.

(10) Patent No.: US 9,461,871 B2
(45) Date of Patent: Oct. 4, 2016

(54) CLIENT SUITABILITY TEST APPARATUS AND METHOD FOR A SUBSTATION AUTOMATING SYSTEM

(75) Inventors: Nam-Ho Lee, Daejeon (KR); Byung-Tae Jang, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 266 days.

(21) Appl. No.: 13/812,766

(22) PCT Filed: Jun. 9, 2011

(86) PCT No.: PCT/KR2011/004227
§ 371 (c)(1),
(2), (4) Date: Jan. 28, 2013

(87) PCT Pub. No.: WO2012/015164
PCT Pub. Date: Feb. 2, 2012

(65) Prior Publication Data
US 2013/0124727 A1      May 16, 2013

(30) Foreign Application Priority Data

Jul. 28, 2010  (KR) .................. 10-2010-0072713

(51) Int. Cl.
*H04L 29/08*      (2006.01)
*H02J 13/00*      (2006.01)
*H04L 12/26*      (2006.01)

(52) U.S. Cl.
CPC ....... *H04L 29/0872* (2013.01); *H02J 13/0079* (2013.01); *H04L 43/50* (2013.01);
(Continued)

(58) Field of Classification Search
CPC .................. H04L 1/24; H04L 2029/06054
USPC .......................................................... 709/224
See application file for complete search history.

(56) References Cited

U.S. PATENT DOCUMENTS 5,949,247 A  *  9/1999  Lima et al. .............. 324/765.01
6,697,961 B1 *  2/2004  Petrenko et al. ................ 714/26
(Continued)

FOREIGN PATENT DOCUMENTS

EP           1850447 A1    10/2007
KR       10-0820923 B1     4/2008
(Continued)

OTHER PUBLICATIONS

Modelling and Simulation for Performance Evaluation of IEC61850-Based Substation Communication Systems Tarlochan S. Sidhu, Fellow, IEEE, and Yujie Yin, Member, IEEE IEEE Transactions on Power Delivery, vol. 22, No. 3, Jul. 2007.*
(Continued)

*Primary Examiner* — Hee Soo Kim
*Assistant Examiner* — Elizabeth Kassa
(74) *Attorney, Agent, or Firm* — McDermott Will & Emery LLP (57) ABSTRACT

The present invention relates to a client suitability test apparatus for a substation automating system with regard to IEC 61850 service between virtual intelligent electronic devices (IEDs) and clients for a plurality of IEDs, wherein the apparatus comprises: a suitability test process generating unit using at least one test model selected from among a plurality of predefined test models, and modeling a suitability test process to test the suitability of a client; a suitability test executing unit for calling a test process model, and executing a suitability test on a client according to the content of the test process model; a communication packet analyzing unit capturing and analyzing a communication packet on a communication response of a virtual IED and the communication request of a client according to the suitability test executing unit; and a test grading unit for grading the suitability test of the client based on test grading conditions of the test process model called by the suitability test executing unit.

6 Claims, 5 Drawing Sheets

(52) U.S. Cl.
CPC .......... *H04L67/2809* (2013.01); *Y02E 60/723* (2013.01); *Y02E 60/724* (2013.01); *Y04S 10/16* (2013.01); *Y04S 10/18* (2013.01); *Y04S 40/168* (2013.01)

(56) References Cited

U.S. PATENT DOCUMENTS

| | | | |
|---|---|---|---|
| 7,516,216 B2* | 4/2009 | Ginsberg et al. | 709/224 |
| 2002/0173927 A1* | 11/2002 | Vandiver | 702/122 |
| 2003/0051188 A1* | 3/2003 | Patil | 714/4 |
| 2004/0179515 A1* | 9/2004 | Kamani et al. | 370/352 |
| 2008/0120521 A1* | 5/2008 | Poisson et al. | 714/26 |
| 2009/0070051 A1* | 3/2009 | Vetter et al. | 702/57 |
| 2009/0070062 A1* | 3/2009 | Kirrmann et al. | 702/122 |
| 2009/0076762 A1* | 3/2009 | Vetter | H04L 43/028 702/122 |
| 2010/0204948 A1* | 8/2010 | Kirrmann et al. | 702/117 |
| 2010/0256832 A1* | 10/2010 | Kirrmann et al. | 700/293 |
| 2011/0047264 A1* | 2/2011 | Hilpert et al. | 709/224 |
| 2012/0099478 A1* | 4/2012 | Fu et al. | 370/254 |

FOREIGN PATENT DOCUMENTS

| | | |
|---|---|---|
| KR | 10-0931559 B1 | 12/2009 |
| KR | 2010-0023222 A | 3/2010 |

OTHER PUBLICATIONS

Development of GIS condition monitoring and diagnosis system based on IEC61850. 2012 IEEE International Conference on Condition Monitoring and Diagnosis Sep. 23-27, 2012, Bali, Indonesia.*

Efficient Testing of Modern Protection IEDs. by Boris Bastigkeit, Thomas Schossig and Dr. Fred Steinhauser, OMICRON electronics, Austria. Winter.2009.*

Nam-Ho Lee, "Development of IEC 61850 Client Testing System for Verifying the Communication Conformance of Substation Automation," Journal of the Korean Institute of Illuminating and Electrical Installation Engineers, 2010.

Extended European Search Report issued in Application No. 11812694.5 dated Mar. 26, 2015.

Lee N.H et al.: "The Testing Method of Data Transmission services of IEC 61858 based Client", Transmission & Distribution Conference & Exposition: Asia and Pacific, 2009, IEEE, Piscataway, NJ, USA, Oct. 26, 2009, pp. 1-4.

Tan J.C et al.: "The Importance of IEC 61850 Interoperability Testing", Universities Power Engineering Conference, 2008. UPEC 2008. 43rd International, IEEE, Piscataway, NJ, USA, Sep. 1, 2008, pp. 1-5.

* cited by examiner

CLIENT SUITABILITY TEST APPARATUS AND METHOD FOR A SUBSTATION AUTOMATING SYSTEM

This application is a 371 of international application PCT/KR11/004227 filed Jun. 9, 2011, which claims priority based on Korean Patent Application No. 10-2010-0072713 filed July. 28, 2010, the entire contents of each of which is hereby incorporated by reference.

TECHNICAL FIELD

The present invention relates to a client suitability test apparatus and method for a substation automation system and, more particularly, to a client suitability test apparatus and method for a substation automation system that test the suitability of a client that supports an IEC 61850 communication service that constitutes part of a smart grid substation automation system.

BACKGROUND ART

After IEC 61850, that is, the international communication standard for substation automation systems, was established, products of high-level management systems, such as Intelligent Electronic Devices (IEDs) and Human Machine Interfaces (HMIs), to which the single standard is applied and which are intended for the protection, control and monitoring of substations, have been mass-produced, and also the application area of IEC 61850-based substation automation systems has been enlarged, in domestic and foreign countries.

In an IEC 61850-based substation automation system, information is exchanged using a digital method based on a server and a client in an Ethernet environment, rather than a conventional hard-wire based one-to-one correspondence method.

In the IEC 61850-based substation automation system, all pieces of equipment that constitute a substation are implemented as virtual data models, and all products are implemented using the same data information objects.

Currently, a test for the suitability of an IED that operates as a server in a substation automation system is considered to be an essential prerequisite for establishing a substation automation system, and this has been the case since the IEC 61850 standard was established in 2005. Additionally, interest in test procedures and test tools has continued to increase.

However, for a client, that is, a counterparty, only a draft version of a test procedure has been released.

DISCLOSURE

Technical Problem

Accordingly, an object of the present invention is to provide a client suitability test apparatus and method that enable a user to easily model a procedure for a client suitability test in order to completely verify the interoperability of a substation automation system.

Furthermore, another object of the present invention is to provide a client suitability test apparatus and method for a substation automation system that enable the suitability of a client to be tested in the substation automation system, thereby establishing a foundation for the verification of the performance of a smart grid and verifying the possibility of practical use.

Technical Solution

In order to accomplish the above objects, the present invention provides a client suitability test apparatus for a substation automation system, with respect to IEC 61850 communication service between virtual Intelligent Electronic Device (IEDs) corresponding to a plurality of IEDs and a client, the apparatus including a suitability test procedure generation unit configured to model a suitability test procedure for testing suitability of the client using one or more test models that are selected from among a plurality of test models; a suitability test execution unit configured to invoke a suitability test procedure model and then conduct a test for the suitability of the client in accordance with content of the suitability test procedure model; a communication packet analysis unit configured to capture and analyze a communication request from the client and a communication packet of a communication response from a selected virtual IED in conformity with instructions from the suitability test execution unit; and a test judgment unit configured to judge the test for the suitability of the client based on test judgment conditions of the test procedure model that is invoked by the suitability test execution unit.

The test procedure creation unit may include a test model selection unit configured to select the test models necessary for the modeling of the suitability test procedure for testing the suitability of the client; a test model editing unit configured to input and edit content of the test models that is selected by a tester; and a test model location adjustment unit configured to automatically arrange the selected test models, and modify relative locations of the test models or delete test models that are unnecessary for the corresponding suitability test procedure.

The test model editing unit may provide an IEC 61850 communication service list requested by the client to the tester, and input the type of communication response from the virtual IED that is suitable for an IEC 61850 communication service that is selected from the communication service list by the tester.

The test model editing unit may select either a positive response or a negative response as the type of communication response from the virtual IED, and, in a case of the negative response, input a negative response message selected by the tester, into the test models.

The test model editing unit may provide a selectable data type list of the virtual IED, corresponding to the IEC 61850 communication service selected by the tester, to the tester, and input data that the client will request from the virtual IED into a corresponding test model based on information that is selected by the tester.

The data type list may include at least one of a Report Control Block (RCB), a GOOSE Control Block (GoCB), a Sampled Value Control Block (SVCB), a Log Control Block (LCB), a Setting Group Control Block (SGCB), a Logical Device (LD), a Logical Node (LN), a Data Object (DO), a Data Attribute (DA), and control data (a DO, a SBO, a DOw, and a SBOw).

The test model location adjustment unit may model the suitability test procedure for testing the suitability of the client by connecting the arranged test models with lines.

The test model location adjustment unit may set the number of repetitions of the test procedure model, and set a repetitive section between the test models.

The communication packet analysis unit may receive the communication IP addresses of all virtual IEDs used to test the suitability of the client, and, during the conducting of the test for the suitability, select and analyze only communication packets related to the input communication IP addresses.

The test procedure model may include an introduction test model in which an operation and sequence of the corresponding suitability test procedure have been defined.

Meanwhile, the present invention provides a client suitability test method for a substation automation system, with respect to IEC 61850 communication service between virtual IEDs corresponding to a plurality of IEDs and a client, the method including generating a suitability test procedure model for testing suitability of the client using one or more test models that are selected from among a plurality of test models; invoking the suitability test procedure model, and then conducting a test for the suitability of the client in accordance with content of the suitability test procedure model; capturing and analyzing a communication request from the client and a communication packet of a communication response from a selected virtual IED during the conducting of the test for the suitability of the client; and judging the test for the suitability of the client based on test judgment conditions of the test procedure model.

Generating the suitability test procedure model may include inputting and editing content of the selected test models; automatically arranging the selected test models, and modifying relative locations of the test models or deleting test models that are unnecessary for the corresponding suitability test procedure; and connecting the arranged test models with lines.

Inputting and editing the content of the selected test models may include providing an IEC 61850 communication service list requested by the client to a tester; and inputting a type of communication response from the virtual IED that is suitable for an IEC 61850 communication service that is selected from the communication service list by the tester.

Inputting the type of communication response from the virtual IED may include selecting either a positive response or a negative response as the type of communication response from the virtual IED; and, if the negative response has been selected, inputting a negative response message selected by the tester, into the test models.

Inputting and editing the content of the selected test models may include providing a selectable data type list of the virtual IED, corresponding to the IEC 61850 communication service selected by the tester, to the tester; and inputting data that the client will request from the virtual IED into a corresponding test model based on information that is selected by the tester.

Connecting the arranged test models with the lines may include setting the number of repetitions of the test procedure model and setting a repetitive section between the test models.

The client suitability test method may further include offering guidance on an operation and sequence of the corresponding suitability test procedure during the conducting of the test for the suitability.

Advantageous Effects

In accordance with the present invention, there is the advantage of being able to efficiently and conveniently conduct a test for the suitability of the IEC 61850 communication service of a high-level management system that is used for data exchange in a substation automation system in view of the fact that the suitability of the communication service of both an IED functioning as a server and a high-level management system functioning as a client should be verified in order to fully realize an IEC 61850-based digital substation that is one of the major systems of a smart grid intelligent power network.

Furthermore, the present invention has the advantages of, when developing high-level management systems in domestic and foreign countries and establishing an IEC 61850 substation automation system, being able to verify the performance of products and also extending the possibility of commercializing a client IEC 61850 test apparatus using the technology that is presented by the present invention.

DESCRIPTION OF THE PREFERRED EMBODIMENTS

Embodiments of the present invention will be described with reference to the accompanying drawings below.

The present invention is intended to provide a client test procedure that enables a client test apparatus to perform a substation automation client suitability test procedure in such a way as to, in a substation automation system suitability test procedure, select test models, like shapes, select data inside the models, and enable a tester to simply input test-related content, rather than using a complicated and difficult programming language.

Figure 1:
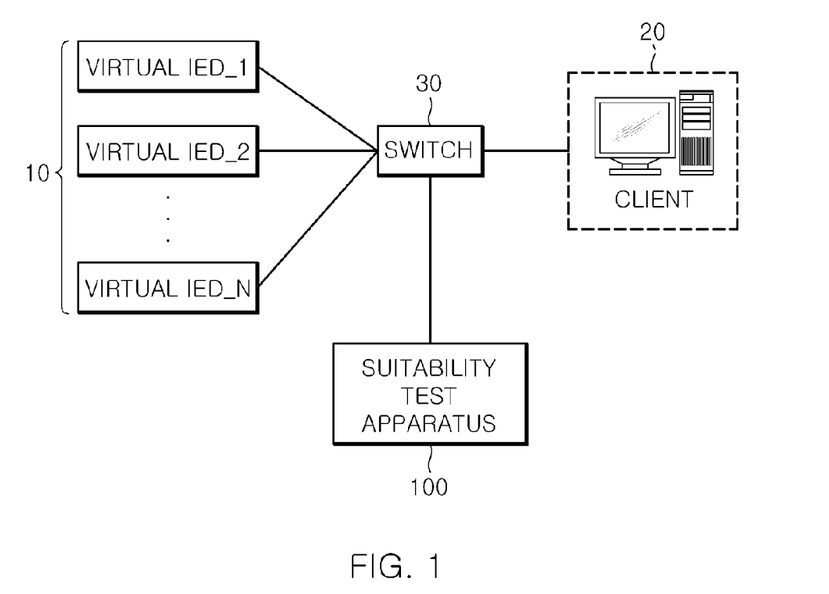
FIG. 1 is a diagram illustrating the configuration of a system to which a client suitability test apparatus in accordance with the present invention has been applied.

FIG. 1 is a diagram illustrating the configuration of a system to which a client suitability test apparatus in accordance with the present invention has been applied.

As illustrated in FIG. 1, a substation automation system to which the present invention is applied is configured to exchange information in such a way that the client 20 of a high-level management system and Intelligent Electronic Devices (IEDs), that is, a plurality of pieces of server equipment, are connected over a network. Here, the substation automation system is a system that is conformable to the international communication standard IEC 61850.

Furthermore, the substation automation system includes a plurality of virtual IEDs 10, that is, a virtual IED_1, a virtual IED_2, . . . , a virtual IED_N, that provide communication services in response to IEC 61850 communication requests from the client 20, in accordance with the actual IEDs of a substation.

Meanwhile, the suitability test apparatus 100 in accordance with the present invention is connected between the client 20 and a plurality of virtual IEDs 10. In this case, the suitability test apparatus 100 tests the suitability of the client 20 between one of the virtual IEDs 10 and the client 20 depending on the operating status of a switch (for example, a network switch) 30 in response to a communication request from the client 20.

Figure 2:
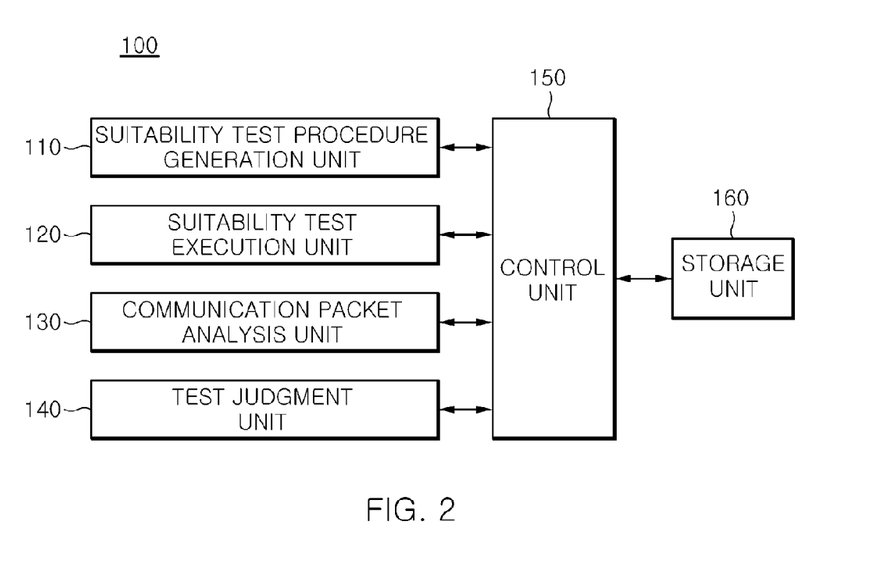
FIG. 2 is a block diagram which is referred to in order to illustrate the configuration of the client suitability test apparatus in accordance with the present invention.

For a description of the detailed configuration of the suitability test apparatus in accordance with the present invention, refer to FIG. 2.

FIG. 2 is a block diagram which is referred to in order to illustrate the configuration of the client suitability test apparatus in accordance with the present invention.

As illustrated in FIG. 2, the suitability test apparatus 100 in accordance with the present invention includes a suitability test procedure generation unit 110, a suitability test execution unit 120, a communication packet analysis unit 130, a test judgment unit 140, a control unit 150, and a storage unit 160.

The storage unit 160 stores test models that are necessary for a test for the suitability of the client 20.

The suitability test procedure generation unit 110 models a test procedure that is used to test the suitability of the client 20. Here, the suitability test procedure generation unit 110 selects at least one from among a plurality of test models stored in the storage unit 160, and creates a test procedure model using the selected test model. For a description of the detailed configuration of the suitability test procedure generation unit 110, refer to FIG. 3.

The suitability test procedure generation unit 110 stores the created test procedure model in the storage unit 160.

Furthermore, the storage unit 160 records the test procedure of each test procedure model in the form of text, and provides text-type information corresponding to a request when a tester requests information about the test procedure model. Accordingly, the tester can quickly check the test procedure of the test procedure model that has been requested.

The suitability test execution unit 120 invokes a test procedure model stored in the storage unit 160, and conducts a test for the suitability of the client 20 in accordance with the content that is defined in the corresponding test procedure model.

The communication packet analysis unit 130 captures and analyzes an IEC 61850 communication request from the client 20, a communication response from the virtual IED 10, and communication packets related to data transmission in conformity with instructions from the suitability test execution unit 120.

It will be apparent that the communication packet analysis unit 130 acquires in advance the communication Internet protocol (IP) addresses of the client 20 that is a test target and the communication IP addresses of all virtual IEDs 10 that are used for a test.

The communication packet analysis unit 130 captures communication packets between the virtual IED 10 and the client 20. Here, the communication packet analysis unit 130 selects and analyzes only communication packets related to the communication IP address of an input virtual IED 10.

Here, the communication packet analysis unit 130 may use one of various methods of capturing communication packets between the client 20 and the virtual IED 10.

As an example, the communication packet analysis unit 130 may be enabled to capture communication packets between the client 20 and the virtual IED 10 by additionally installing a suitability test system in a computer device on which the client 20 is executed.

Furthermore, the communication packet analysis unit 130 may capture communication packets between the client 20 and the virtual IED 10 using the mirroring function of the network switch 30.

Furthermore, the communication packet analysis unit 130 may be enabled to capture communication packets between the client 20 and the virtual IED 10 by inserting an electronic device capable of mirroring communication packets between the client 20 and the network switch 30.

It will be apparent that the above-described three methods are merely embodiments and a method by which the communication packet analysis unit 130 captures communication packets between the client 20 and the virtual IED 10 is not limited to any one thereof.

Meanwhile, the storage unit 160 stores test judgment conditions corresponding to the content defined in the stored test procedure model.

Here, the test judgment unit 140 judges the test for the suitability of the client 20 based on the test judgment conditions stored in the storage unit 160 while the test for the suitability of the client 20 is being conducted by the suitability test execution unit 120.

Furthermore, the test judgment unit 140 may receive the results of the judgment of the client suitability test from the tester, and then use the results to judge the client suitability test.

The test judgment unit 140 stores the results of the judgment of the test for the suitability of the client 20 in the storage unit 160. It will be apparent that the test judgment unit 140 may generate the results of the judgment of the client suitability test in the form of a separate file.

Figure 3:
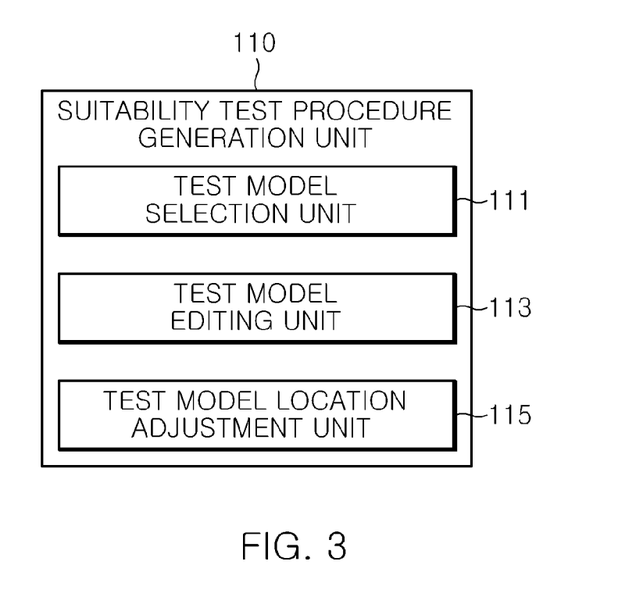
FIG. 3 is a block diagram which is referred to in order to illustrate the detailed configuration of a suitability test procedure generation unit in accordance with the present invention.

FIG. 3 is a block diagram which is referred to in order to illustrate the detailed configuration of the suitability test procedure generation unit 110 in accordance with the present invention.

As illustrated in FIG. 3, the suitability test procedure generation unit 110 in accordance with the present invention includes a test model selection unit 111, a test model editing unit 113, and a test model location adjustment unit 115.

The test model selection unit 111 selects a test model necessary for the modeling of a client suitability test procedure.

Here, in order to select a test model, the test model selection unit 111 may not only be used, but the tester may also select the test model using a computer input device such as a mouse.

The test model selected by the test model selection unit 111 may be an introduction test model. Here, the introduction test model includes content necessary to guide the operations of the client 20 and the virtual IED 10 through the suitability test, or descriptions necessary during the test that are input, in the form of text.

Accordingly, the suitability test execution unit 120 may display the content input into the introduction test model on a computer screen during the conducting of the client suitability test.

The test model editing unit 113 inputs and edits the content of the test model that is selected by the test model selection unit 111.

Here, the test model editing unit 113 provides an IEC 61850 communication service list requested by the client 20 to the tester. Once a single IEC 61850 communication service has been selected from the communication service list, the test model editing unit 113 selects the type of communication response that is suitable for the IEC 61850 communication service selected by the tester and that the virtual IED 10 should make.

Here, the test model editing unit 113 may select either a positive response or a negative response as the type of communication response that should be made by the corresponding virtual IED 10.

If the negative response is selected as the communication response of the virtual IED 10, the test model editing unit 113 automatically sorts a message list that corresponds to the negative response and that is suitable for the corresponding IEC 61850 communication service, and provides the message list to the tester. Here, the test model editing unit 113 inputs a negative response message selected by the tester, into the test model.

If the communication response type is not selected, the test model editing unit 113 checks only an IEC 61850 communication request from the client 20 and ignores a response from the virtual IED 10 during the conducting of the suitability test.

Meanwhile, the test model editing unit 113 inputs data that will be requested by the client 20 from the virtual IED 10 in the IEC 61850 communication service selected by the tester, into the test model.

Here, the test model editing unit 113 invokes an IEC Configuration Description (ICD) file including the data information of the virtual IED 10, and provides a selectable data type list to the tester.

In other words, the test model editing unit 113 selects a Report Control Block (RCB), a GOOSE Control Block (GoCB), a Sampled Value Control Block (SVCB), a Log Control Block (LCB), a Setting Group Control Block (SGCB), a Logical Device (LD), a Logical Node (LN), a Data Object (DO), a Data Attribute (DA), and control data (a DO, a SBO, a DOw, and a SBOw) from the invoked ICD file, and provides them to the tester.

Here, the test model editing unit 113 causes the types of data selected by the tester to be input into the test models.

The test model editing unit 113 provides the tester with a data set held by the virtual IED 10 so that the tester can perform selection.

Furthermore, if the client 20 generates a data set in the virtual IED 10 using the IEC 61850 communication service, the test model editing unit 113 provides the tester with a data list held by the virtual IED 10. Thereafter, the test model editing unit 113 may have a plurality of pieces of data selected by the tester, thereby generating one that is the same as a data set list that the client 20 requests via communication.

Meanwhile, during the judgment of the suitability test, the test model editing unit 113 may skip test models that belong to a plurality of test models generated for the modeling of client suitability test procedures and that do not correspond to the test purposes of the client 20.

The test model location adjustment unit 115 automatically arranges the test models selected by the selection unit 111, and modifies the relative locations of the test models or deletes one or more unnecessary test models.

Here, the test model location adjustment unit 115 adjusts the incorrect sequence of a plurality of test models, generated up to the present time, during the editing of the test models, while automatically arranging the test models.

Furthermore, the test model location adjustment unit 115 models the test procedure by connecting the arranged test models with lines. Accordingly, the suitability test execution unit 120 may conduct the test for the suitability of the client 20 in the sequence of the connection of the arranged test models during the conducting of the client suitability test.

Furthermore, the test model location adjustment unit 115 may define the number of repetitions of each test procedure model, and set a repetitive section by connecting test models with a line.

Figure 4:
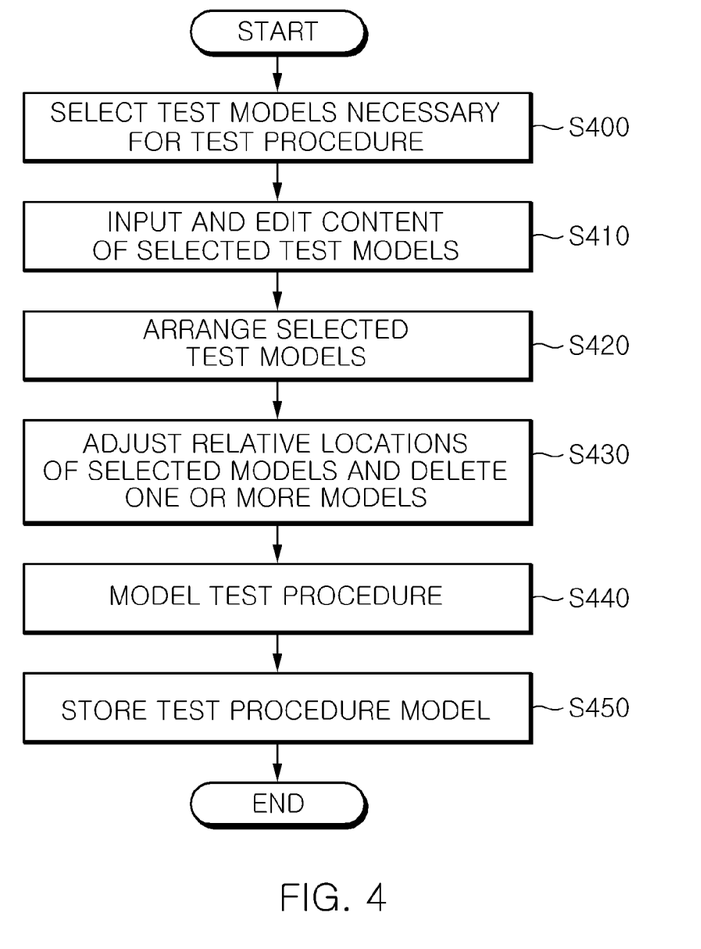
FIGS. 4 and 5 are flowcharts illustrating the operation flow of a process of modeling a test procedure for a client suitability test in accordance with the present invention.
Figure 5:
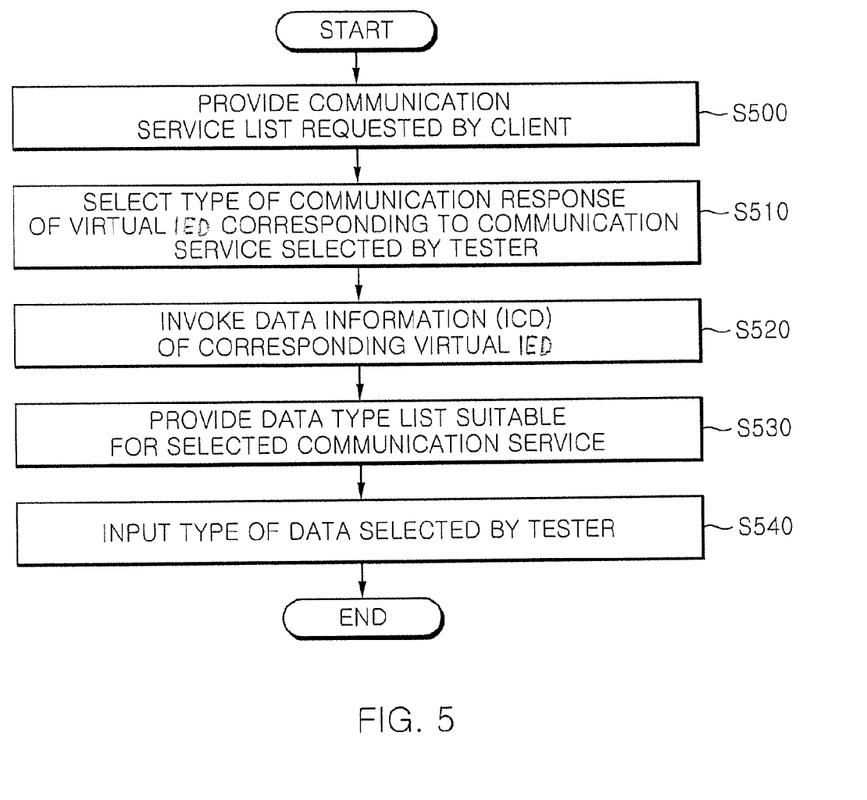

FIGS. 4 and 5 are flowcharts illustrating the operation flow of a process of modeling a test procedure for a client suitability test in accordance with the present invention.

As illustrated in FIG. 4, at step S410, the suitability test apparatus 100 selects test models necessary for the modeling of a client suitability test procedure at step S400, and inputs and edits the content of the test models selected at step S400.

Thereafter, the suitability test apparatus 100 arranges the selected test models at step S420, and modifies the relative locations of the test models or deletes one or more unnecessary test models at step S430.

Thereafter, the suitability test apparatus 100 models the suitability test procedure by connecting the arranged test models with lines at step S440.

Finally, the suitability test apparatus 100 stores the test procedure model generated at step S440 in the storage unit 160, thereby terminating the process of modeling a suitability test procedure.

FIG. 5 illustrates the detailed operation flow of step S410 of FIG. 4.

Referring to FIG. 5, the suitability test apparatus 100 provides an IEC 61850 communication service list requested by the client 20 to the tester, prior to inputting the content of the test models at step S500.

Thereafter, at step S510, once a single IEC 61850 communication service has been selected from the communication service list by the tester, the suitability test apparatus 100 selects the type of communication response that the virtual IED 10 corresponding to the IEC 61850 communication service selected by the tester should make. Here, the suitability test apparatus 100 may select either a positive response or a negative response as the type of communication response that the corresponding virtual IED 10 should make.

Furthermore, the suitability test apparatus 100 invokes an ICD file including the data information of the virtual IED 10 at step S520, and provides a data type list suitable for the selected communication service to the tester at step S530.

Thereafter, the suitability test apparatus 100 causes the type of data selected by the tester at step S530 to be input into the test models at step S540.

Figure 6:
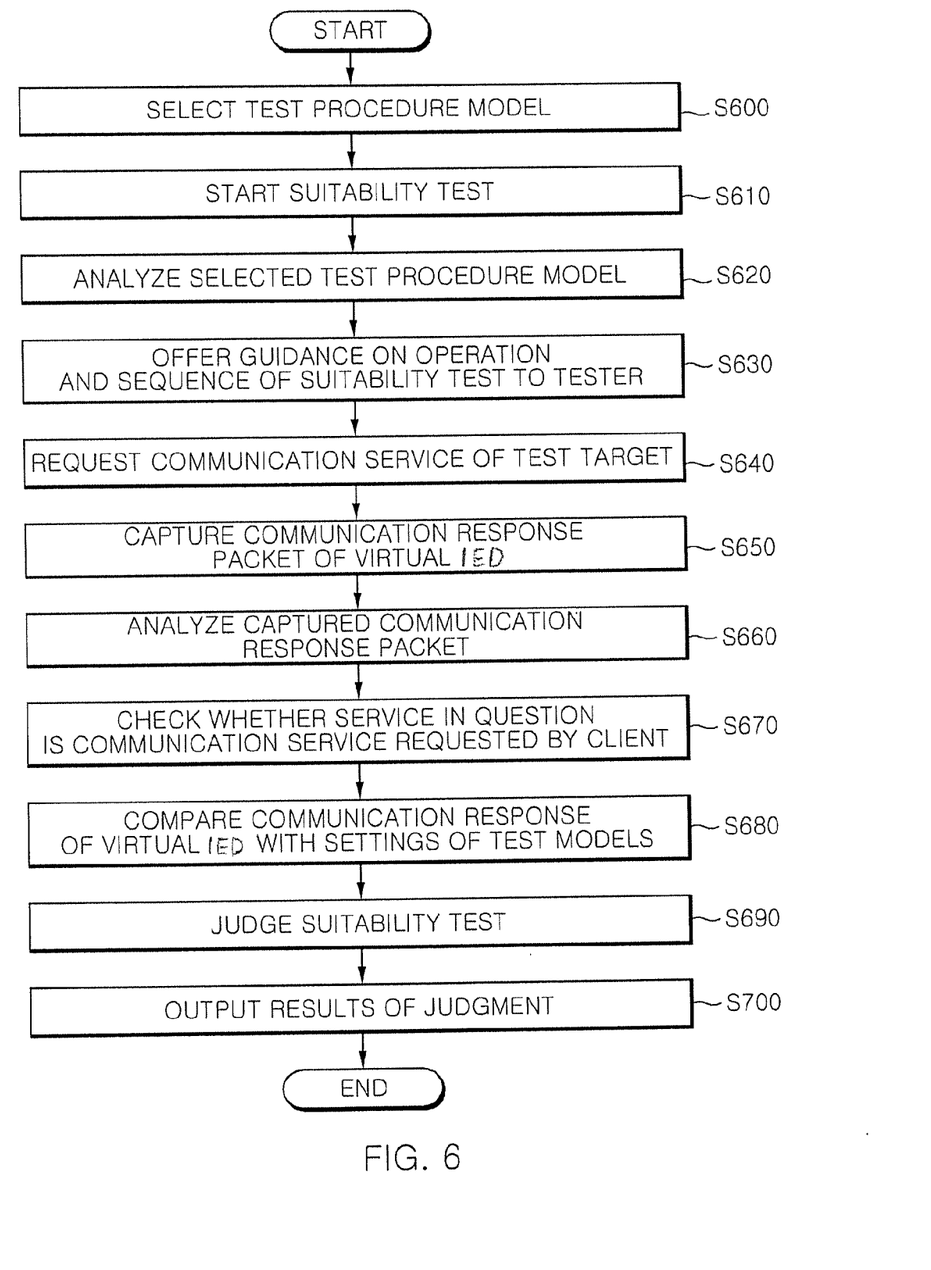
FIG. 6 is a flowchart illustrating the operation flow of a client suitability test method in accordance with the present invention.

FIG. 6 is a flowchart illustrating the operation flow of a client suitability test method in accordance with the present invention.

As illustrated in FIG. 6, the suitability test apparatus 100 invokes test procedure models stored in the storage unit 160 and selects one from among the test procedure models at step S600. Thereafter, at step S610, the suitability test apparatus 100 conducts a test for the suitability of the client 20 in accordance with the content defined in the test procedure model selected at step S600.

Once the suitability test has started, the suitability test apparatus 100 analyzes the selected test procedure model at step S620. Here, if an introduction test model is included in the selected test procedure model, the suitability test apparatus 100 offers guidance on the operation and sequence of the suitability test to the tester based on the content defined in the introduction test model at step S630.

While the suitability test is being conducted, the suitability test apparatus 100 captures the IEC 61850 communication service requested by the client 20 corresponding to a test target, and the communication response packets of the virtual IED 10, at steps S640 and S650.

Here, the suitability test apparatus 100 analyzes the communication response packets captured at step S650, at step S660, and then checks whether a service in question is the communication service requested by the client 20 at step S670.

Furthermore, the suitability test apparatus 100 compares the communication response of the virtual IED 10 with the settings of the test models at step S680, and judges the suitability test based on the results of the comparison at step S690.

Finally, the suitability test apparatus 100 outputs the results of the judgment at step S690, thereby terminating the process of the test for the suitability of the client 20.

Although the client suitability test apparatus and method for a substation automation system in accordance with the present invention have been described with reference to the illustrative drawings, the present invention is not limited to the embodiments and the drawings disclosed in this application, but may be varied within the range of protection of the technical spirit.

The invention claimed is:

1. A client suitability test method for a substation automation system, with respect to IEC 61850 communication service between virtual Intelligent Electronic Devices (IEDs) corresponding to a plurality of IEDs and a client, the method comprising:

generating a suitability test procedure model for testing suitability of the client using one or more test models that are selected from among a plurality of test models;

invoking the suitability test procedure model, and then conducting a test for the suitability of the client in accordance with content of the suitability test procedure model;

capturing and analyzing a communication request from the client and a communication packet of a communication response from a selected virtual IED during the conducting of the test for the suitability of the client;

checking whether the IEC 61850 communication service is the communication service requested by the client; and comparing the communication response of the virtual IED with settings of the test models, and then judging the test for the suitability of the client based on test judgment conditions of the test procedure model, wherein generating the suitability test procedure model comprises:

inputting and editing content of the selected test models;

automatically arranging the selected test models, and modifying relative locations of the test models or deleting test models that are unnecessary for the corresponding suitability test procedure; and connecting the arranged test models with lines, wherein connecting the arranged test models with the lines comprises setting a number of repetitions of the test procedure model and setting a repetitive section between the test models, wherein the selected test models include an introduction test model including a guidance on an operation of the client and the virtual IED through the test or a description during the test in text form, wherein conducting a test for the suitability of the client in accordance with the content of the suitability test procedure model comprises displaying the guidance or the description to a tester.

2. The client suitability test method of claim 1, wherein inputting and editing the content of the selected test models comprises:

providing an IEC 61850 communication service list requested by the client to a tester; and inputting a type of communication response from the virtual IED that is suitable for an IEC 61850 communication service that is selected from the communication service list by the tester.

3. The client suitability test method of claim 2, wherein inputting the type of communication response from the virtual IED comprises:

selecting either a positive response or a negative response as the type of communication response from the virtual IED; and if the negative response has been selected, inputting a negative response message selected by the tester, into the test models.

4. The client suitability test method of claim 1, wherein inputting and editing the content of the selected test models comprises:

providing a selectable data type list of the virtual IED, corresponding to the IEC 61850 communication service selected by the tester, to the tester; and inputting data that the client will request from the virtual IED into a corresponding test model based on information that is selected by the tester.

5. The client suitability test method of claim 4, wherein the data type list comprises at least one of a Report Control Block (RCB), a GOOSE Control Block (GoCB), a Sampled Value Control Block (SVCB), a Log Control Block (LCB), a Setting Group Control Block (SGCB), a Logical Device (LD), a Logical Node (LN), a Data Object (DO), a Data Attribute (DA), and control data (a DO, a SBO, a DOw, and a SBOw).

6. The client suitability test method of claim 1, wherein the step of capturing and analyzing comprises, receiving communication IP addresses of all virtual IEDs used to test the suitability of the client, and, during the conducting of the test for the suitability; and selecting and analyzing only communication packets related to the input communication IP addresses.

* * * * *